FIG. 2

3,069,406
UNIAXIALLY ORIENTED CRYSTALLINE
POLYMERS
Seymour Newman and Myer Ezrin, Springfield, Mass., assignors to Monsanto Chemical Company, St. Louis, Mo., a corporation of Delaware
Filed Oct. 17, 1958, Ser. No. 767,941
7 Claims. (Cl. 260—93.5)

The present invention relates to the production of polystyrene and more particularly to the production of uniaxially oriented crystalline polystyrene exhibiting improved properties of tensile strength and ultimate elongation.

Conventional polystyrene, hereinafter referred to as atactic polystyrene, is characterized by an amorphous, non-crystallizable nature, and is soluble in many common organic solvents such as benzene, naphtha, carbon tetrachloride and the like. While it has been proposed that atactic polystyrene can be stretch-oriented into fibers, the product which results remains amorphous, as well as soluble in common organic solvents, consequently it has little utility as a textile grade fiber. More specifically, it has been determined that fibers stretched from atactic polystyrene have an orientation which is lost when the material is subjected to a temperature in excess of 90° C. Of remote interest only, are reports that fibers of exceedingly fine diameters can be prepared from atactic polystyrene, which exhibit high-tensile strengths. However, these fibers maintain their amorphous characteristics and lose orientation when subjected to temperatures greater than 90° C. This combined with their solubility in common organic solvents and exceedingly fine diameter foreclose them from consideration as fibers of practical or commercial significance.

Accordingly, it is the principal object of the present invention to provide crystalline polystyrene adapted for fiber usages.

Another object is to provide a process by which to produce uniaxially oriented polystyrene exhibiting improved qualities of tensile strength and ultimate elongation.

Other objects of the invention will in part be obvious and will in part appear hereinafter.

These and other objects of the invention are attained through practice of a process which involves longitudinally stretching substantially amorphous crystallizable polystyrene 250–2500% at a rate of greater than about 100% per minute and at a temperature of 85–200° C. and thereafter heat setting said longitudinally stretched polystyrene at a temperature of 100–200° C. and under longitudinal tension.

Recent work has developed crystallizable polystyrene. One such polystyrene is that termed "isotactic" polystyrene by G. Natta and P. Corradini, Makro Chemie 16, 77–80 (1955). Another proposed crystallizable polystyrene is "syndiotactic" polystyrene. Crystallizable polystyrene need not contain actual crystallinity as such and in this latter form can be referred to as amorphous crystallizable polystyrene or amorphous isotactic polystyrene. Once having become crystallized it can be referred to simply as crystalline polystyrene or crystalline isotactic polystyrene.

Non-crystallizable or atactic polystyrene and crystallizable polystyrene are apparently reflective of their sources and more particularly of the polymerization processes by which they are obtained. Atactic polystyrene is obtained through homogeneous polymerization processes utilizing free radical catalysts as for instance peroxides such as benzoyl peroxide. Crystallizable or crystalline polystyrene and specifically isotactic polystyrene, can be produced by heterogeneous polymerization processes utilizing organometallic-transition metal halide catalysts, as for example, triethylaluminum-titanium tetrachloride catalyst.

The following is illustrative of heterogeneous polymerizations capable of producing isotactic polystyrene.

EXAMPLE I

Ninety-nine parts by weight of styrene monomer and one part by weight of triethylaluminum-titanium tetrachloride catalyst are charged into a reaction kettle. The molar ratio of aluminum to titanium in the catalyst is about 3.0:1.0. The vessel is raised to a temperature of 65–75° C. and maintained at this temperature until 20% conversion of the monomer charge takes place.

A quantity of methanol sufficient to react with the catalyst remaining is added to the reaction mixture causing polymerization to terminate. The polymer in solid form is filtered and washed in a Buchner funnel with a volume of acetone equal to the volume of the initial styrene monomer charge.

The polystyrene is removed from the funnel, placed in a reflux vessel together with acetone containing 1% by volume of concentrated hydrochloric acid, and refluxed under atmospheric reflux conditions for 30 minutes. Following filtering and washing repeatedly in a Buchner funnel until a colorless filtrate is obtained, the solid polymer is dried under vacuum and at a temperature of 110°–120° C. until constant weight is obtained.

The polymer is determined to contain isotactic polystyrene having a molecular weight of 3–4 million. Molecular weight is determined by measuring the intrinsic viscosity of a solution of the polystyrene in o-dichlorobenzene containing 0.2 to 0.3 parts of ditertiary butyl p-cresol at $25.0° \pm 0.02°$ C. In order to solvate the isotactic polystyrene a temperature of 175–185° C. together with shaking for about 15 minutes is necessary.

The existence of isotactic polystyrene can be established through a number of tests. These tests include appraisal of (a) density (absolute density), (b) solubility, (c) melting point and (d) X-ray diffraction analysis, all of which are preferably carried out on a sample of the material which has been first subjected to a particular thermal treatment. The thermal treatment is designed to institute crystallinity in isotactic polystyrene and assure the detection of otherwise uncrystallized isotactic polystyrene. In crystalline form isotactic polystyrene is distinguishable from atactic for the reason that the latter polystyrene does not crystallize but rather remains amorphous after thermal treatment.

Taking the density test as illustrative; if the density is found to exceed 1.054 grams/cm.$^3$, the material may be considered to contain crystallinity, it having been determined that the presence of crystalline isotactic polymer is reflected by densities ranging between 1.054–1.124 grams/cm.$^3$. In like manner the solubilities and the melting points of crystalline isotactic material will characteristically differ from thermally treated atactic polystyrene which retains its amorphous characteristics.

Representative of thermal treatment which can be carried out prior to taking the above defined measurements, i.e., density, melting point, etc., a sample of the polystyrene to be tested is compression molded and then subjected to a temperature of 180°–190° C. for a period of 2 hours. The density of the thermally treated sample is determined by comparing its weight taken in a liquid of known density, such as water, with its weight taken in air. Samples of polystyrene produced in accordance with the process of Example I, after being thermally treated in the described manner, normally exhibit densities of about 1.08 grams/cm.$^3$.

Figure 1:
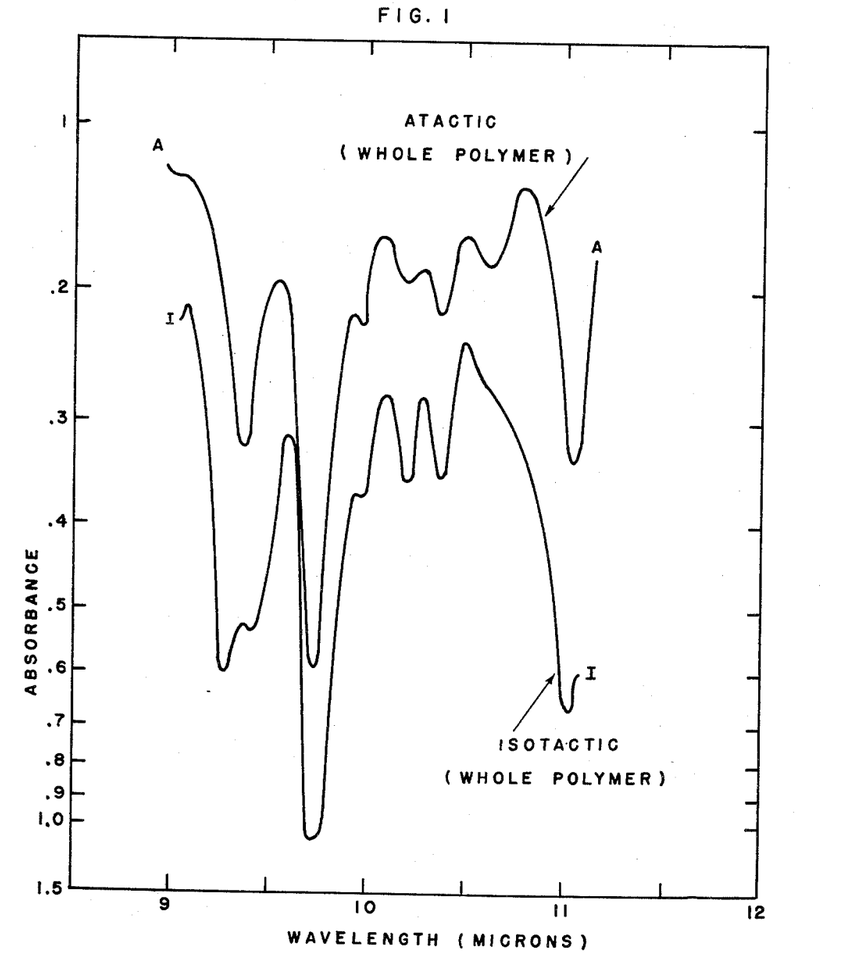

Another test which can be carried out to determine whether a given polystyrene is isotactic as compared to atactic involves the use of infrared spectrum analysis. A thin specimen of the polystyrene to be tested is prepared by molding or casting from solution. The specimen is then tested in a Perkin-Elmer, Model No. 21, Double Beam Infrared Recording Spectrometer. Atactic polystyrene shows a band at 9.35 microns, whereas isotactic polystyrene exhibits a doublet at about 9.25 microns and 9.45 microns. In addition, the band at 10.6 microns observable in atactic polystyrene is missing in the isotactic isomer. This procedure is capable of determining the existence of crystallizable isotactic polystyrene directly and does not require that the sample be subjected to thermal pretreatment in order to institute crystallinity as in the case of the prior tests such as density, etc. Typical spectra for atactic polystyrene and isotactic polystyrene are shown at FIG. 1. Curve A is indicative of atactic polystyrene whereas curve I is that for isotactic polystyrene. Point ($i$) indicates the position of the doublet referred to while point ($a$) indicates the position of the 10.6 band.

As indicated above, it is possible to have both atactic and isotactic isomers present in a given mass of polystyrene. In order to separate the two and obtain at least a high concentration of the isotactic polymer, the mass is fractionated, as by solvent extraction using acetone, benzene, toluene or other common organic solvents in which the atactic isomer is soluble. In example I this is accomplished using acetone.

The polystyrene which is preferred as a starting material in the present invention is isotactic polystyrene which is essentially amorphous, in other words, it should contain practically no crystallinity, the same being less than the amount of crystallinity indicated by the material having a density of less than about 1.06. Greater than this amount of crystallinity, in the starting material is generally accompanied by fracture or rupture of the polystyrene when subjected to the heat setting step which follows the stretching step. In order to determine the amount of crystallinity, the starting material, and more desirably a sample of the starting material is subjected to either the previously described density test, or to X-ray diffraction analysis both of which are quantitative as to the amount of crystallinity contained in a given sample. The density test is carried out as previously described but without the need for thermal pretreatment of the sample to be tested.

If it is determined that the isotactic polystyrene has greater than about 1.06 density, reflecting an excess crystallinity beyond that which is desirable, it is subjected to pretreatment designed to reduce the crystallinity below this critical amount and approaching an amorphous condition. Reduction of crystallinity can be accomplished by subjecting the isotactic polystyrene to a temperature approaching and preferably above its melting point, (about 233° C.). Since the orientation process will generally be carried on as a continuous operation, the thermal pretreatment can be carried out during extrusion of the melt through a heated extrusion head or other conditioning apparatus used in polymeric work. If the orientation process is to be postponed in time the polystyrene is cooled rapidly to a temperature below about 90° C. in air or liquid. Lowering of the temperature in effect freezes the polystyrene in the induced amorphous state. In the continuous type operation, the proximity of the melt to the stretching step eliminates the need for cooling.

The substantially amorphous isotactic polystyrene is supported to a stretching procedure at temperature of about 85°–200° C. At temperatures below about 85° C. the isotactic polystyrene presents resistance to being stretched and tends to fracture. While at temperatures above about 200° C., isotactic polystyrene exhibits characteristics of viscous flow which interfere with proper orientation. A more prescribed range of temperature under which stretching is carried out is about 100°–140° C. In this latter range hot stretching results rather than cold drawing, the latter resulting from the use of temperatures below this range.

Under the temperature range prescribed above the isotactic polystyrene is subjected to longitudinal stretching of 250–2500% and more particularly 250–1000% at a rate of greater than 100% elongation per minute. Percent elongation is defined as $(L(f)/L(i)-1) \times 100$ where $L(f)$ and $L(i)$ refer to final and initial lengths respectively.

In determining the amount of longitudinal stretching and consequently the amount of unilateral orientation to which a particular isotactic polystyrene material is subjected successfully, the birefringence of the material can be informative. Birefringence is derived from measurement of the differential of the refractive indices of the material parallel to and perpendicular to its longitudinal axis which is also its axis of orientation. Birefringence measurements can be made using a quartz wedge or a Babinet compensator which indicates retardation to the light by the specimen. Dividing the retardation by the thickness of the specimen yields a value for birefringence. For present purposes the birefringence is expressed in Angstroms of retardation per mil thickness of the specimen.

Birefringence measurements are taken of a number of samples of isotactic polystyrene which are derived from practice of the process of Example I, followed by thermal pretreatment to insure that the isotactic polystyrene is in substantially amorphous state. The samples are stretched various amounts prior to measurement. The temperature at which stretching of the samples is carried out is 112°–115° C. The birefringence data of the sample is plotted as curve IS (isotactic-stretched) of FIG. 2 and will be discussed more fully below.

The rate at which stretching is to be initiated must also be considered. In general, if orientation of 250% or greater is to be initiated starting at 85° C., it requires a rate of stretching of at least about 100% per minute. At rates slower than 100% per minute the inherent tendency of the material to relax to its natural or random state is sufficient to effectively negate the stretching or orientation initiated in the material, with the result that less than an effective amount of net orientation results in the stretched material. As the temperature of stretching is raised the speed of stretching is increased. The increase in speed is about one decade (10X) for every increase of 10° C. At 115° C. stretching is preferably carried out at 2000–20,000% per minute. The upper limit for speed of stretch is determined by the fracture strength of the material.

The function served by the setting step is twofold, first it operates to institute further orientation or order into the material beyond that already initiated by the stretching step. This is graphically indicated by the birefringence curve identified as curve ISH (isotactic polystyrene-stretched-heated) in FIG. 2 which will be discussed more fully further on, on this application. Ancillary to the preceding, crystallization takes place during the heat setting step which serves to prevent loss of orientation in the event that the finished product is later subjected to temperature in the range of 90°–230° C.

Heat setting is carried out at temperatures ranging between 100–200° C. The rate and amount of heat setting depend upon time, temperature of setting and the amount of stretch or orientation present in the material to be heat set. To attain higher amounts of heat setting in a given amount of time, the temperature at which heat setting is carried out need only be in inverse relationship with the amount of orientation initiated in the material by the stretching step. Variations in the temperature as indicated above are exercised in the range of 100–200° C. When subjected to heat setting the polystyrene is generally under tension sufficient to maintain the stretched length substantially constant during the setting step. This includes however the expedient of allowing a certain amount of retraction to take place prior to heat setting, with the result that the stretched length of the material which is to be heat set, is less than that instituted by the stretching step. To be effective, however, if the material is allowed to retract or relax, the stretched length which ultimately results nevertheless should be greater than about 75% when compared to the stretched length resulting from the stretching step. The time for heat setting is preferably up to 60 seconds at 180° C. for about 500% stretch initiated orientation; however, longer periods are prescribed when lesser amounts of orientation have been initiated by the stretching step.

EXAMPLE II

A. *Stretched (only) Isotactic Polystyrene*

Isotactic polystyrene produced in accordance with the procedure of Example I in powdered form is compression molded to films of 5 x 5 x .008 inches using a molding temperature of 250°-260° C. This is followed by immediately quenching the films in cold water (15° C.). The films are then cut into a number of 3 x 0.5 inch strips and these are uniaxially stretched at 112°-115° C. between 1-5 seconds. The amount of stretching initiated in the strips is as follows: 250, 350 and 525±25% followed by their being quenched by simply withdrawing them into cool air while being maintained under tension. The average birefringence of the samples is as follows:

TABLE I

| Percent stretch: | Birefringence (average) A./mil |
|---|---|
| 250 | $4.0 \times 10^3$ |
| 350 | $5.3 \times 10^3$ |
| 525±25 | $15.7 \times 10^3$ |

Figure 2:
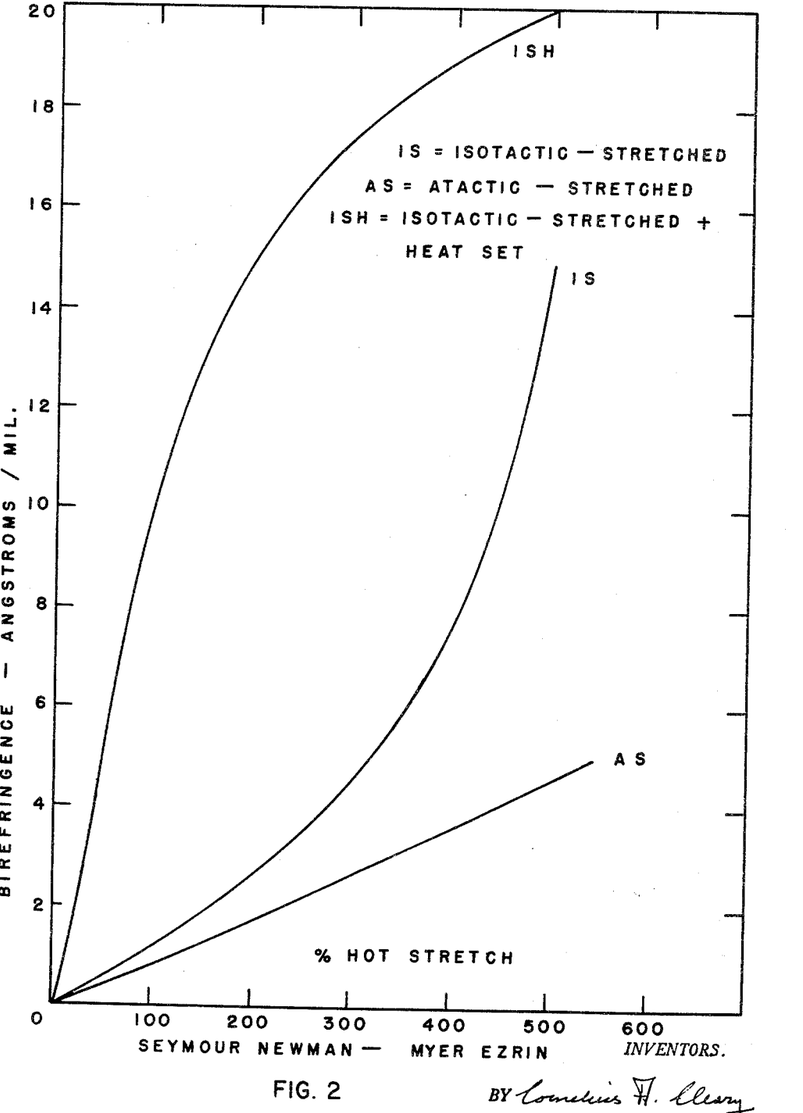

These data are used to plot curve IS of FIG. 2.

B. *Stretched and Heat Set Polystyrene*

The strips of isotactic polystyrene which have been stretched according to procedure A are clamped at both ends onto a chrome plate to maintain the defined amounts of stretch therein and then are heat set at 180° C. The birefringence of the samples is observed to be as follows:

TABLE II

| Percent stretch: | Birefringence (average) A./mil |
|---|---|
| 250 | $15.9 \times 10^3$ |
| 350 | $18.3 \times 10^3$ |
| 525±25 | $21.2 \times 10^3$ |

EXAMPLE III

*Production of Atactic Polystyrene*

Charge a reaction vessel with 99.9 weight percent of styrene monomer and .1 weight percent of ditertiary butyl peroxide. Raise the temperature of the vessel to 100° C. and maintain for 40 hours. The polystyrene is removed as a solid from the reaction vessel and granulated by crushing.

The procedure set forth in Example II A is followed in producing test strips of atactic material 3 x 0.5 x .008 inches in thickness. The strips are then stretched 250, 350, and 525±25% and the birefringence measurements of the samples are observed. The values are as follows:

TABLE III

| Percent stretch: | Birefringence A./mil |
|---|---|
| 0 | 0 |
| 250 | $2.3 \times 10^3$ |
| 350 | $3.2 \times 10^3$ |
| 525±25 | $4.9 \times 10^3$ |

The data from this table are used to plot line AS of FIG. 2. When the stretched samples are subjected to the procedure of Example II B, using temperatures as low as 90° C., the birefringence in each measures zero, indicating that the orientation instituted by stretching atactic material is lost during heat setting and/or being subjected to a temperature above 90° C.

Referring then to FIG. 2, the following conclusions can be arrived at: (1) comparison of curve IS with line AS indicates that an unexpected amount of orientation results from stretching isotactic polystyrene above 250% stretch, (2) comparison of curve ISH with curve IS indicates that added orientation also results when stretched isotactic polystyrene is subjected to heat setting at temperatures above 100° C. and carried out while the stretched isotactic polystyrene is maintained under tension. This is particularly significant in view of the fact that stretched atactic polystyrene when introduced to comparable heat setting results in a complete loss of the orientation induced by stretching.

Consideration of the tensile behavior of the materials produced also serves to indicate the relative effectiveness derivable from orienting polystyrene, using variations as to starting materials, stretching (solely) and stretching followed by heat setting. This involves testing various samples or specimens produced in accordance with Examples II A, II B and III, in an Instron tensile tester.

Specimens, two sets of each, made from the materials being tested, are prepared in strips 3 inches long. Each specimen is clamped in the Instron tensile tester, maintained at a constant temperature of 23° C. and constant relative humidity of 50%. The data derived directly from the Instron are in lbs. of load which can be converted to stress in lbs. per square inch of original cross-sectional area. The first set of specimens are subjected to 10% per minute rate of elongation (strain) to fracture. The test results are shown in Table IV which follows:

TABLE IV

*Tensile Properties at 10% Min. Rate of Strain*

| Polymer description No. | Stretch, percent | Heat set 180° C. | Initial modulus, p.s.i. $\times 10^{-5}$ | Yield stress, p.s.i. $\times 10^{-3}$ | Elongation | | Tensile strength, p.s.i. $\times 10^{-3}$ |
|---|---|---|---|---|---|---|---|
| | | | | | Yield, percent | Break, percent | |
| Atactic 1 | 0 | No | 2.4 | | | 1.7 | 3.9 |
| Atactic 2 (stretched) | 250 | No | 3.61 | 9.5 | 4.9 | 39.0 | 8.1 |
| Atactic 3 (stretched) | 350 | No | 3.43 | 9.6 | 4.6 | 15.0 | 8.4 |
| Atactic 4 (stretched) | 525±25 | No | 4.03 | 10.1 | 3.5 | 18.0 | 9.5 |
| Isotactic 5 | 0 | No | 1.93 | 5.2 | 3.5 | 4.5 | 5.1 |
| Isotactic 6 (stretched) | 250 | No | 3.21 | 11.4 | 4.9 | 27.0 | 10.4 |
| Isotactic 7 (stretched) | 350 | No | 4.30 | 12.3 | 4.1 | 30.0 | 15.5 |
| Isotactic 8 (stretched) | 525±25 | No | 6.53 | 17.9 | 4.2 | 9.0 | 19.3 |
| Isotactic 9 (stretched and heat set) | 250 | Yes | 5.58 | 15.4 | 3.6 | 31.0 | 19.0 |
| Isotactic 10 (stretched and heat set) | 350 | Yes | 6.64 | 16.2 | 3.3 | 20.0 | 22.4 |
| Isotactic 11 (stretched and heat set) | 525±25 | Yes | 6.98 | 20.8 | 4.2 | 15.0 | 29.7 |

The second set of specimens is subjected to 100% per minute rate of strain again to fracture. The test results are contained in Table V which follows:

TABLE V
*Tensile Properties at 100% Min. Rate of Strain*

| Polymer description No. | Stretch, percent | Heat set 180° C. | Initial modulus, p.s.i. ×10⁻⁵ | Yield stress, p.s.i. ×10⁻³ | Elongation Yield, percent | Elongation Break, percent | Tensile strength, p.s.i. ×10⁻³ |
|---|---|---|---|---|---|---|---|
| Atactic 1'.............................. | 0 | No...... | 2.90 | ........ | ........ | 1.8 | 4.6 |
| Atactic 2' (stretched)............ | 250 | No...... | 4.33 | 10.4 | 5.0 | 6.0 | 9.5 |
| Atactic 3' (stretched)............ | 350 | No...... | 4.11 | 10.3 | 8.0 | 11.0 | 9.2 |
| Atactic 4' (stretched)............ | 525±25 | No...... | 4.24 | 11.0 | 4.5 | 30.0 | 9.6 |
| Isotactic 5'............................ | 0 | No...... | 2.53 | ........ | ........ | 2.7 | 6.2 |
| Isotactic 6' (stretched)......... | 250 | No...... | 4.14 | 13.3 | 4.7 | 34.0 | 13.1 |
| Isotactic 7' (stretched)......... | 350 | No...... | 4.81 | 14.2 | 4.1 | 19.0 | 18.9 |
| Isotactic 8' (stretched)......... | 525±25 | No...... | 7.30 | 19.9 | 3.9 | 9.0 | 20.9 |
| Isotactic 9' (stretched and heat set). | 250 | Yes..... | 6.06 | 15.8 | 3.5 | 23.0 | 22.0 |
| Isotactic 10' (stretched and heat set). | 350 | Yes..... | 7.12 | 18.7 | 3.6 | 17.0 | 24.2 |
| Isotactic 11' (stretched and heat set). | 525±25 | Yes..... | 8.10 | 22.2 | 4.1 | 14.0 | 29.2 |

The data of Tables IV and V are combined and plotted against % stretch of the test specimens to arrive at the curves shown in FIGS. 3–6.

Figure 3:
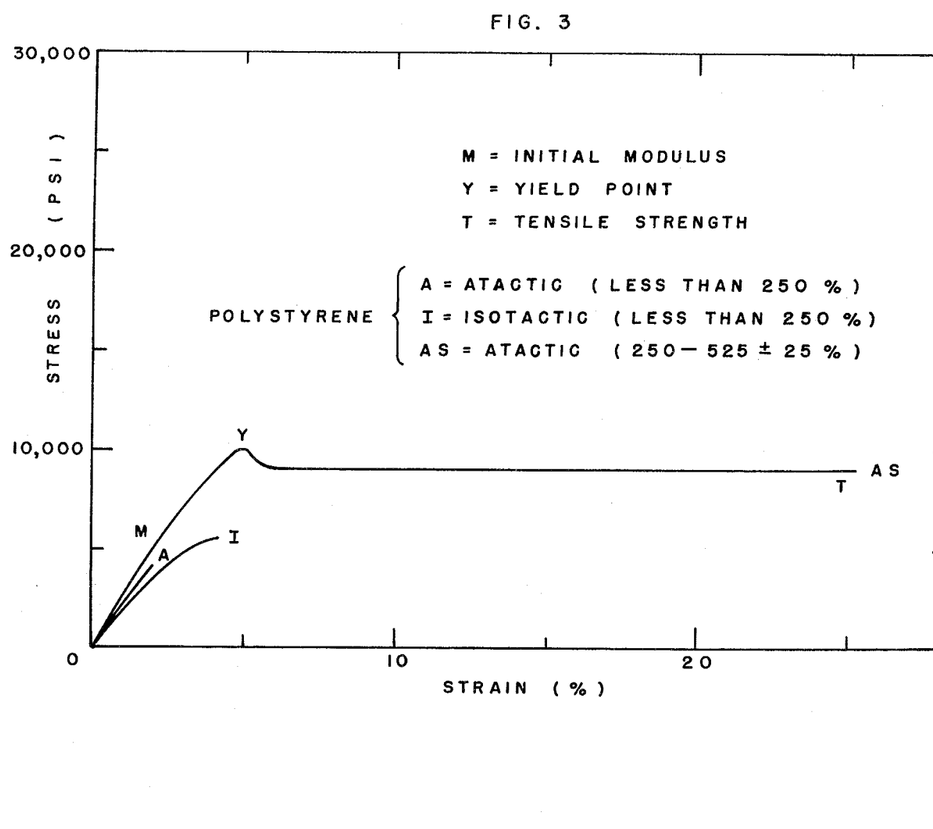

Referring now to FIGS. 3–6 in that order:

FIG. 3 contains curve A representing unstretched atactic polystyrene, the plotting data for which are derived from specimens Nos. 1 and 1'; curve I representing unstretched isotactic polystyrene, the plotting data for which is derived from specimens, Nos. 5 and 5'; and curve AS representing atactic polystyrene stretched 250–525±25%, the plotting data for which are derived from specimens Nos. 2, 2', 3, 3', 4 and 4'.

Figure 4:
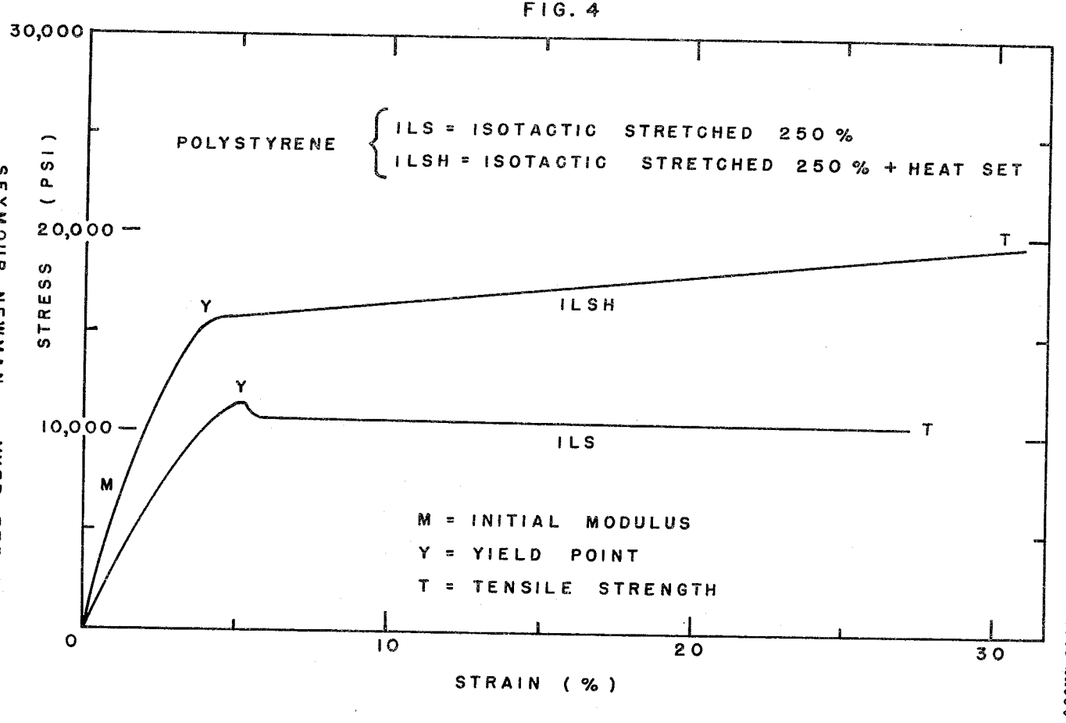

FIG. 4 contains curve ILS representing isotactic polystyrene stretched 250%, the plotting data for which are derived from specimens Nos. 6, 6'; and curve ILSH representing isotactic polystyrene stretched 250% and heat set, the plotting data for which are derived from 9 and 9'.

Figure 5:
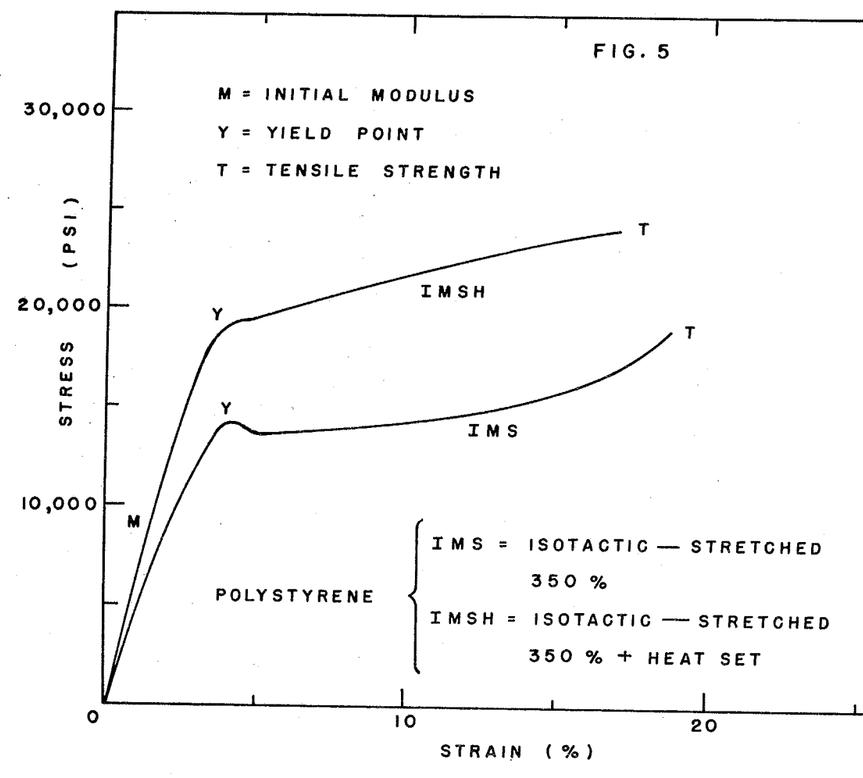

FIG. 5 contains curve IMS representing isotactic polystyrene stretched 350%, the plotting data for which are derived from specimens, Nos. 7 and 7'; and curve IMSH representing isotactic polystyrene stretched 350% and heat set, the plotting data for which are derived from specimens Nos. 10 and 10'.

Figure 6:
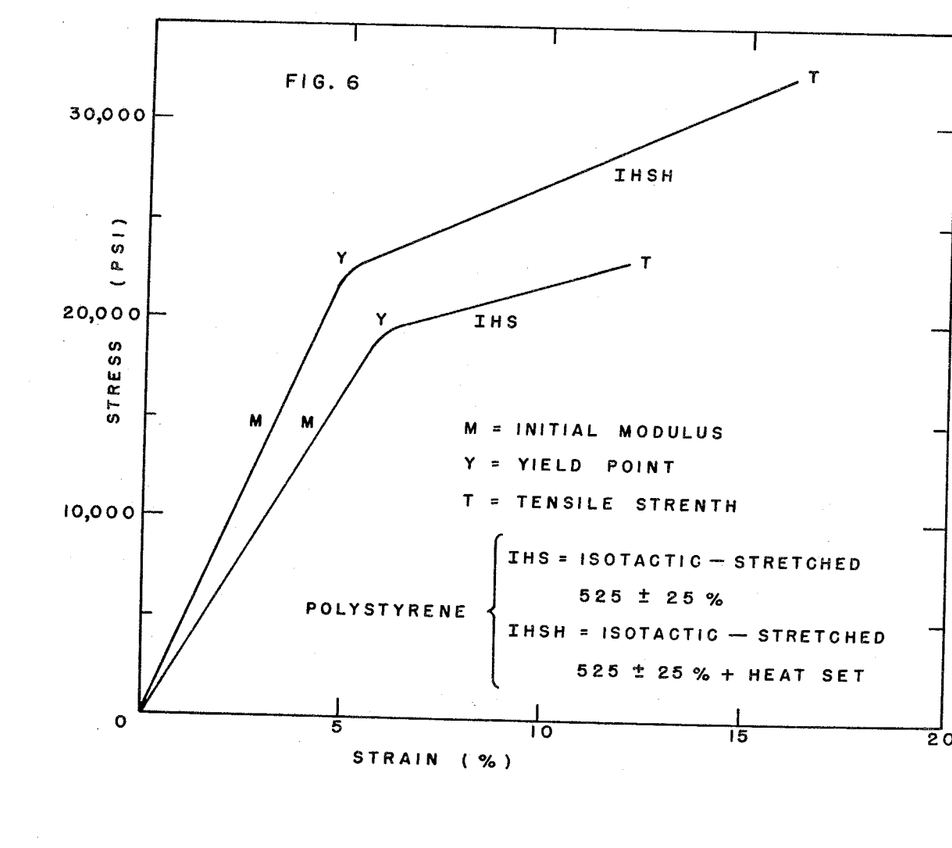

FIG. 6 contains curve IHS representing isotactic polystyrene stretched 525±25%, the plotting data for which are derived from specimens Nos. 8 and 8'; and curve IHSH representing isotactic polystyrene stretched 525±25% and heat set, the plotting data for which are derived from specimens, Nos. 11 and 11'.

Each of the curves of FIGS. 3–6 begins with a steep slope indicated generally at M where stress is in linear proportion to strain. This ratio at small deformations is defined as the initial modulus which is a measure of rigidity. Increase in the initial slope of the curve indicates increased modulus. the abrupt change in direction of the slope is called the yield point indicated at Y. The nature of the stress-strain curve at and beyond the yield point indicates (1) whether the fibers can sustain a stress beyond the yield point and (2) whether the stress increases or decreases with strain beyond the yield point, the former being the more attractive attribute. Ultimately the fibers fracture under stress as indicated at T.

Initially, orientation increases with stretching as reflected by the comparative steepness of slope M. In each of the curves contained in FIGS. 3–6, more rigid fibers are indicated by the steeper slope.

Of more significance, is the behavior of the fibers after they have been extended by the test procedure to their yield points, Y, and then beyond to their point of fracture, T, the portions of the curves which are of most interest then are those between Y and T. Referring to FIG. 3, atactic and isotactic polystyrene which is unstretched or stretched less than 250% tends to show brittle behavior when tested in tension, indicating their undesirability as fiber materials. Note that fracture occurs at or immediately beyond the yield point in curves A and I, indicating that the material lacks the toughness required of textile grade fibers. Atactic polystyrene when stretched between 250%–525±25% reflects under the test procedure a less brittle nature as indicated by its ability to be extended beyond its yield point. The testing data indicate that deformation takes place at a constant and a relatively low stress which is less than the desired. In actual practice, this type of deformation takes place in a localized region of the specimen and indicates a product which can be irreversibly deformed at relatively low stress levels. This behavior is deducible from the configuration of curve AS.

Consideration of FIG. 4 and more particularly curve ILS thereof, indicates that isotactic polystyrene which has been hot-stretched 250%, but which has not been heat set suffers the same deficiency as atactic polystyrene stretched to this amount. With heat setting, however, isotactic polystyrene stretched 250% shows increased attractiveness as a textile grade fiber. See curve ILSH. The material does not locally deform and in addition exhibits a continuous rise in stress beyond the yield point up to the point of fracture when subjected to test extension. This is particularly significant when it is recalled that atactic polystyrene when subjected to temperature conditions of heat setting loses its orientation as indicated by curves A and I of FIG. 3.

Referring to FIG. 5, curve IMS is reflective of the tensile behavior of isotactic polystyrene stretched 350% but which has not been heat set. This curve indicates an improvement in the tensile behavior resulting from stretching. What is particularly dramatic here, however, is the improvement which curve IMSH shows over curve IMS. Curve IMSH is indicative of the tensile behavior of isotactic polystyrene which has been stretched 350% followed by heat setting. Materials so treated definitely approach textile grade material.

FIG. 6, curve IHS, is reflective of isotactic polystyrene which has been stretched 525±25%. The tensile behavior for this material approaches the acceptable for textile grade materials. What is particularly noteworthy here, however, is the improvement which can be attained in tensile behavior by the expedient of heat setting the material as indicated by curve IHSH.

Considering FIGS. 3–6, collectively, it can be concluded that: (1) isotactic polystyrene which is stretched greater than 250% has tensile properties which are a distinct advantage over atactic polystyrene stretched in any amount and/or followed by heat set. And, in addition, isotactic polystyrene stretched greater than about 250% shows a distinct improvement in tensile behavior over isotactic polystyrene stretched less than this amount; (2) stretching isotactic polystyrene greater than about 250% and following the same by heat setting will contribute a material having even more attractive tensile properties, thus making it useful as a textile fiber material, and (c) at high amounts of stretch, approaching 525±25% followed by heat setting an exceptional fiber material reflecting tensile strength of greater than about 30,000 p.s.i. and ultimate elongations of 14% and greater can be attained.

Crystalline isotactic polystyrene exhibiting a tensile strength of greater than about 20,000 p.s.i. and beyond that up to and greater than 30,000 p.s.i. on the initial cross-sectional area, together with an elongation of greater than about 10% can be produced by the present invention which involves the double expedient of uniaxially stretching essentially amorphous crystallizable polystyrene followed by heat setting as described. The polystyrene which results has high tenacity, toughness, abrasion resistance and flex life as well as optical clarity recommending it for use as a textile fiber. It can be spun, woven and otherwise treated in the manner of textile fibers, filaments and threads and can also be used in the form of tapes, ribbons and the like.

Tenacity and toughness are reflective of the tensile strength and ultimate elongation of the material. Tensile data on a number of samples of isotactic polystyrene which are either stretched (solely) or stretched and heat set are plotted in FIG. 7 serving to indicate that both stretching and heat setting be availed of in order to arrive at polystyrene having the greatest utility as a textile grade fiber. This is in addition to the requirement that essentially amorphous isotactic polystyrene be used as a starting material. Points indicated as circles (0) represent isotactic polystyrene stretched (solely), while points indicated by squares □ represent isotactic polystyrene stretched and heat set. Atactic polystyrenes are represented by crosses (X). Processing data with respect to this is contained in the following table:

TABLE VI

| Polymer (type) | Amount stretch | Heat set | Birefringence, A./mil × 10⁻³ | Tensile, p.s.i. × 10⁻³ |
|---|---|---|---|---|
| Atactic | 250 | No | 2.3 | 8.1 |
|  | 350 | No | 3.2 | 8.4 |
|  | 543 | No | 4.7 | 10.0 |
|  | 550 | No | 4.9 | 8.5 |
|  | 550 | No | 5.9 | 10.0 |
| Isotactic | 250 | No | 4.9 | 11.4 |
|  | 250 | No | 2.3 | 9.3 |
|  | 250 | Yes | 16.9 | 19.4 |
|  | 250 | Yes | 17.9 | 20.5 |
|  | 350 | No | 7.0 | 15.1 |
|  | 350 | No | 6.9 | 15.8 |
|  | 350 | Yes | 19.1 | 23.0 |
|  | 350 | Yes | 15.6 | 16.7 |
|  | 350 | Yes | 17.9 | 22.0 |
|  | 350 | Yes | 18.6 | 21.9 |
|  | 350 | Yes | 19.2 | 22.2 |
|  | 350 | Yes | 17.4 | 22.8 |
|  | 521 | No | 15.2 | 19.4 |
|  | 535 | No | 13.7 | 19.0 |
|  | 530 | No | 15.9 | 19.3 |
|  | 507 | No | 15.9 | 19.3 |
|  | 535 | Yes | 21.8 | 28.7 |
|  | 520 | Yes | 22.1 | 32.2 |
|  | 520 | Yes | 22.6 | 28.2 |

Figure 7:
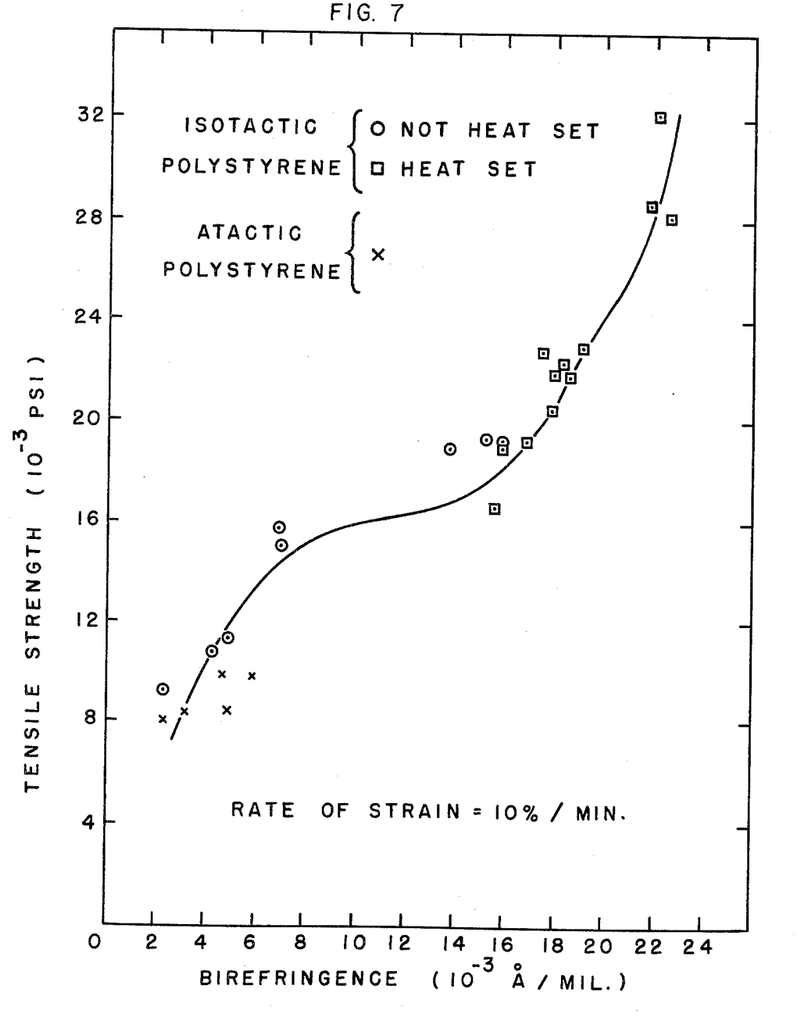

As may be noted from FIG. 7, only the isotactic polystyrene having a birefringence of greater than about 16,000 A./mil generally exhibits tensile strengths greater than 20,000 p.s.i. (and ultimate elongations greater than about 10%). The squares in the figure indicate that this is generally achieved by the combination of stretching and subsequent heat setting essentially amorphous isotactic polystyrene. From this it can be concluded that fiber tenacity and toughness in this range are obtained by the complete process as herein described and more particularly by stretching in the order of greater than 350% followed by heat setting.

In order to indicate that isotactic polystyrene, uniaxially oriented in the manner prescribed by the present invention, has competitive tensile properties; when data for two isotactic polystyrene materials oriented in the manner here prescribed, are calculated and plotted against data published for certain textile materials, the latter including silk, nylon, rayon, wool, etc. The oriented polystyrenes which are used for comparison are isotactic polystyrene stretched 250% followed by heat setting and previously identified in FIG. 4 with curve ILSH, and isotactic polystyrene which is stretched 525±25% followed by heat set, previously identified in FIG. 6 with curve IHSH. The tensile data for these materials contained in Tables 4 and 5 are converted to tenacity in grams per denier using the formula:

$$\text{Tenacity} = \frac{\text{Tensile Strength (p.s.i.)}}{12,800 \times \text{Specific Gravity}} (1.076)$$

Figure 8:
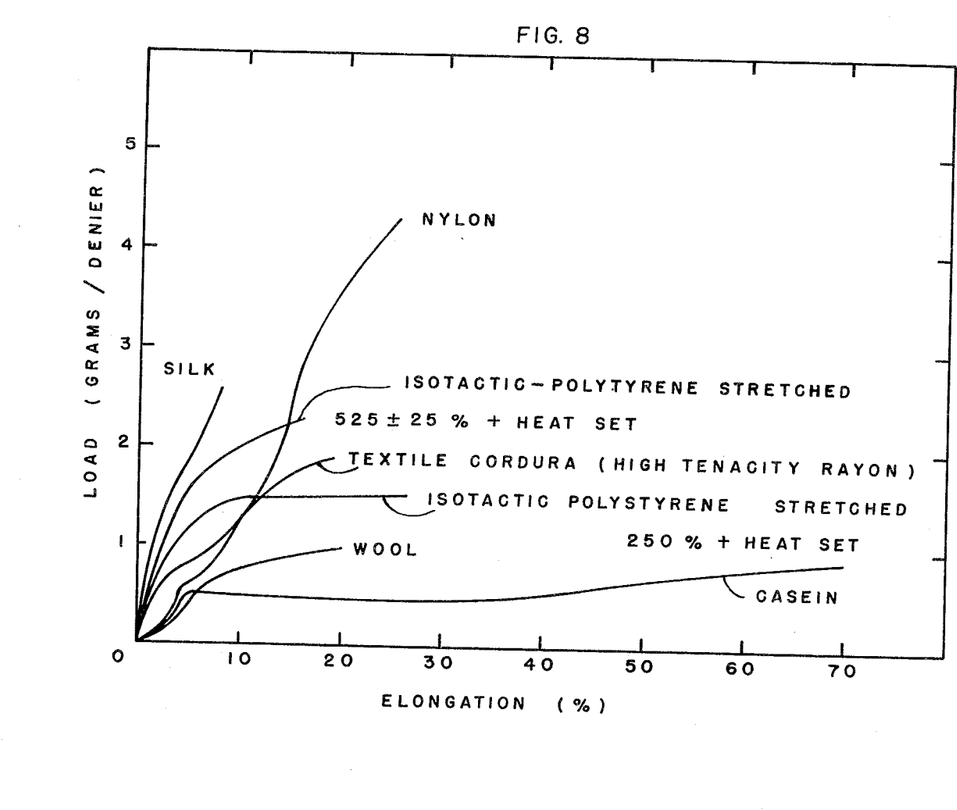

The results are plotted as curves ILSH and IHSH respectively (to be consistent, the same legends are used). Consideration of FIG. 8 indicates that the tensile properties of both of the isotactic polystyrenes oriented in accordance with the present invention exceed in tenacity casein, wool and that in addition, the polystyrene which is stretched 525±25% followed by heat setting (IHSH) also exceeds Textile Cordura (high tenacity rayon) for tenacity.

The stretching step can be accomplished by subjecting substantially amorphous isotactic polystyrene to a series of rolls in tandem or cascade. The rolls are operated at different speeds, the after rolls being operated at relatively higher speeds with the differential being designed to introduce a predetermined amount of stretching of greater than 250% to the isotactic polystyrene, as determined on the original length of the material. The polystyrene is introduced to the stretching step in the form of fibers, ribbons, etc., individually or as tows of the same. Ideally the stretching step, and effectively the stretching rolls, are maintained in an atmosphere which is heated to the desired stretching temperature of 85°–200° C. The same function can also be accomplished by using heated rolls. The overall advance of the rolls together with the effective area of the heated atmosphere or number of heated rolls will determine the speed at which stretching is initiated in the isotactic polystyrene.

Heat setting can be carried out by advancing the isotactic polystyrene on another series of rolls. These too can be operated at differential speeds in order to maintain the desired amounts of stretch or tension in the stretched isotactic polystyrene. Temperature for the heat setting step can be attained using a heated atmosphere or rolls.

It will thus be seen that the objects set forth above among those made apparent from the preceding description are efficiently attained, and since certain changes may be made in carrying out the above orientation process and in the resulting polystyrene products without departing from the scope of the invention, it is intended that all material contained in the above description shall be interpreted as illustrative and not in a limiting sense.

What is claimed is:

1. A method for producing uniaxially oriented crystalline polystyrene members adapated for fiber usages which are essentially insoluble in common oganic solvents under room conditions and retain orientation up to about 230° C., which method comprises longitudinally stretching a shaped body of substantially amorphous isotactic polystyrene 250–2500% at a rate of greater than about 100% per minute and a temperature of 85–200° C. and thereafter heat setting said longitudinally stretched polystyrene body at a temperatre of 100–200° C. while maintaining said stretched polystyrene body under longitudinal tension.

2. A method for producing uniaxially oriented crystalline polystyrene members adapted for fiber usages which are essentially insoluble in common organic solvents under room conditions, retain orientation up to about 230° C., which method comprises longitudinally stretching a shaped body of substantially amorphous isotactic polystyrene 250–1000% at a rate of greater than about 100% per minute and a temperature of 85–200° C. and thereafter heat setting said longitudinally stretched polystyrene body at a temperature of 100–200° C. while maintaining the same under longitudinal tension.

3. A method for producing uniaxially oriented crystalline polystyrene members adapted for fiber usages which are essentially insoluble in common organic solvents under room conditions and retain orientation up to about 230° C., which method comprises longitudinally stretching a shaped body of substantially amorphous isotactic polystyrene 250–1000% at a rate of greater than 100% per minute and a temperature of 100–140° C. and thereafter heat setting said longitudinal stretched polystyrene body at a temperature of 100–200° C. while maintaining the same under longitudinal tension.

4. A method for producing uniaxially oriented crystalline polystyrene members adapted for fiber usages which are essentially insoluble in common organic solvents under room conditions and retain orientation up to about 230° C. which method comprises longitudinally stretching a shaped body of substantially amorphous isotactic polystyrene 250–1000% at a rate of greater than 100% per minute and a temperature of 100–140° C. and thereafter setting said longitudinally stretched polystyrene body at a temperature of 150–200° C. while maintaining the same under longitudinal tension.

5. A method for producing uniaxially oriented crystalline polystyrene members adopted for fiber usages which are essentially insoluble in common organic solvents under room conditions and which retain orientation up to about 230° C. which method comprises longitudinally stretching a shaped body of substantially amorphous isotactic polystyrene 250–1000% at a rate of greater than 100% per minute and a temperature of 100–140° C. and thereafter heat setting said longitudinally stretched polystyrene body at a temperature of about 180° C. while maintaining the same under longitudinal tension for a period of 5–60 seconds.

6. A method for producing uniaxially oriented crystalline polystyrene members adapted for fiber usages which are essentially insoluble in common organic solvents under room conditions and which retain orientation up to about 230° C. which method comprises longitudinally stretching a shaped body of substantially amorphous isotactic polystyrene 250–2500% at a rate of greater than about 100% per minute and a temperature of 85–200° C. and thereafter heat setting said longitudinally stretched polystyrene body at a temperature of 100–200° C. while subjecting said polystyrene body to longitudinal tension sufficient to maintain greater than 75% of the longitudinal stretch.

7. As a composition of matter a shaped body of uniaxially oriented crystalline polystyrene adapted for fiber usages having a tensile strength of greater than about 20,000 p.s.i. and an elongation of greater than about 10% and which retains said orientation when subjected to a temperature up to about 230° C.

References Cited in the file of this patent

UNITED STATES PATENTS

| | | |
|---|---|---|
| 2,129,213 | Harz et al. | Sept. 6, 1938 |
| 2,185,789 | Jague | Jan. 2, 1940 |
| 2,325,060 | Ingersoll | July 27, 1943 |
| 2,412,187 | Wiley et al. | Dec. 3, 1946 |
| 2,823,421 | Scarlett | Feb. 18, 1958 |
| 2,997,743 | Isaksen et al. | Aug. 29, 1961 |

FOREIGN PATENTS

| | | |
|---|---|---|
| 538,782 | Belgium | Dec. 6, 1955 |